(12) United States Patent
Chu et al.

(10) Patent No.: US 12,316,901 B2
(45) Date of Patent: May 27, 2025

(54) VIDEO STREAM PROCESSING SYSTEM AND VIDEO STREAM PROCESSING METHOD

(71) Applicant: MEDIATEK INC., Hsin-Chu (TW)

(72) Inventors: Hao-Ping Chu, Hsinchu (TW); Ying-Tsan Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 94 days.

(21) Appl. No.: 18/137,437

(22) Filed: Apr. 21, 2023

(65) Prior Publication Data

US 2023/0379525 A1    Nov. 23, 2023

Related U.S. Application Data

(60) Provisional application No. 63/343,110, filed on May 18, 2022.

(51) Int. Cl.
| | |
|---|---|
| H04N 21/00 | (2011.01) |
| H04N 21/20 | (2011.01) |
| H04N 21/426 | (2011.01) |
| H04N 21/431 | (2011.01) |
| H04N 21/433 | (2011.01) |
| H04N 21/44 | (2011.01) |
| H04N 21/40 | (2011.01) |
| H04N 21/60 | (2011.01) |

(52) U.S. Cl.
CPC ....... *H04N 21/426* (2013.01); *H04N 21/4316* (2013.01); *H04N 21/433* (2013.01); *H04N 21/44004* (2013.01); *H04N 21/44016* (2013.01)

(58) Field of Classification Search
CPC ........ H04N 21/00; H04N 21/20; H04N 21/40; H04N 21/60; H04N 21/80; H04N 21/4316; H04N 21/43
USPC .......................... 386/278, 280.286, 239, 248
See application file for complete search history.

(56) References Cited

U.S. PATENT DOCUMENTS

| | | | |
|---|---|---|---|
| 8,121,349 B2 * | 2/2012 | Momosaki | G11B 27/28 382/103 |
| 2005/0251847 A1 * | 11/2005 | Teng | H04N 5/765 725/100 |
| 2011/0316863 A1 * | 12/2011 | Nishimaki | G06T 1/20 345/545 |
| 2013/0055320 A1 | 2/2013 | Mitchell | |
| 2017/0339431 A1 | 11/2017 | Zhang | |

FOREIGN PATENT DOCUMENTS

TW             201021548 A1    6/2010

* cited by examiner

*Primary Examiner* — Daquan Zhao
(74) *Attorney, Agent, or Firm* — Winston Hsu

(57) ABSTRACT

A video stream processing system, comprising: a first VDP, configured to process first input images of a first video stream to generate first output images, and configured to process second input images of a second video stream to generate second output images; and an image merging circuit, configured to merge one of the first output images and one of the second output images, to generate a first merged image.

17 Claims, 8 Drawing Sheets

VIDEO STREAM PROCESSING SYSTEM AND VIDEO STREAM PROCESSING METHOD

CROSS REFERENCE TO RELATED APPLICATIONS

This application claims the benefit of U.S. Provisional Application No. 63/343,110, filed on May 18, 2022. The content of the application is incorporated herein by reference.

BACKGROUND

A VDP (video display pipe line) in a conventional multi-video display is designed to process one video stream at a time. Accordingly, a conventional multi-video display always comprise more than one VDPs for respectively processing different video streams. However, such structure may cause a high cost. Also, such conventional multi-video display may comprise a VDP with a higher image quality and at least one VDP with a lower quality given the cost consideration. Accordingly, the transition of different VDPs may result poor user experience.

SUMMARY

One objective of the present application is to provide a video stream processing system which can save the number of VDPs and can avoid the transition between VDPs with different image qualities.

Another objective of the present application is to provide a video stream processing method which can save the number of VDPs and can avoid the transition between VDPs with different image qualities.

One embodiment of the present application discloses a video stream processing system, comprising: a first VDP, configured to process first input images of a first video stream to generate first output images, and configured to process second input images of a second video stream to generate second output images; and an image merging circuit, configured to merge one of the first output images and one of the second output images, to generate a first merged image.

Another embodiment of the present application discloses a video stream processing method, comprising: processing first input images of a first video stream to generate first output images by a first VDP (video display pipe line); processing second input images of a second video stream to generate second output images by the first VDP; and merging one of the first output images and one of the second output images, to generate a first merged image.

Still another embodiment of the present application discloses a video stream processing system, comprising: a first VDP, configured to process input images of different video streams to generate output images; and an image merging circuit, configured to merge at least two of the output images to generate a merged video stream corresponding to the video streams.

In view of above-mentioned embodiments, the number of VDPs can be decreased since a single VDP can process more than one video streams. Also, the transition between VDPs with different image qualities can be avoided.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term "first", "second", "third" in following descriptions are only for the purpose of distinguishing different one elements, and do not mean the sequence of the elements. For example, a first device and a second device only mean these devices can have the same structure but are different devices.

Figure 1:
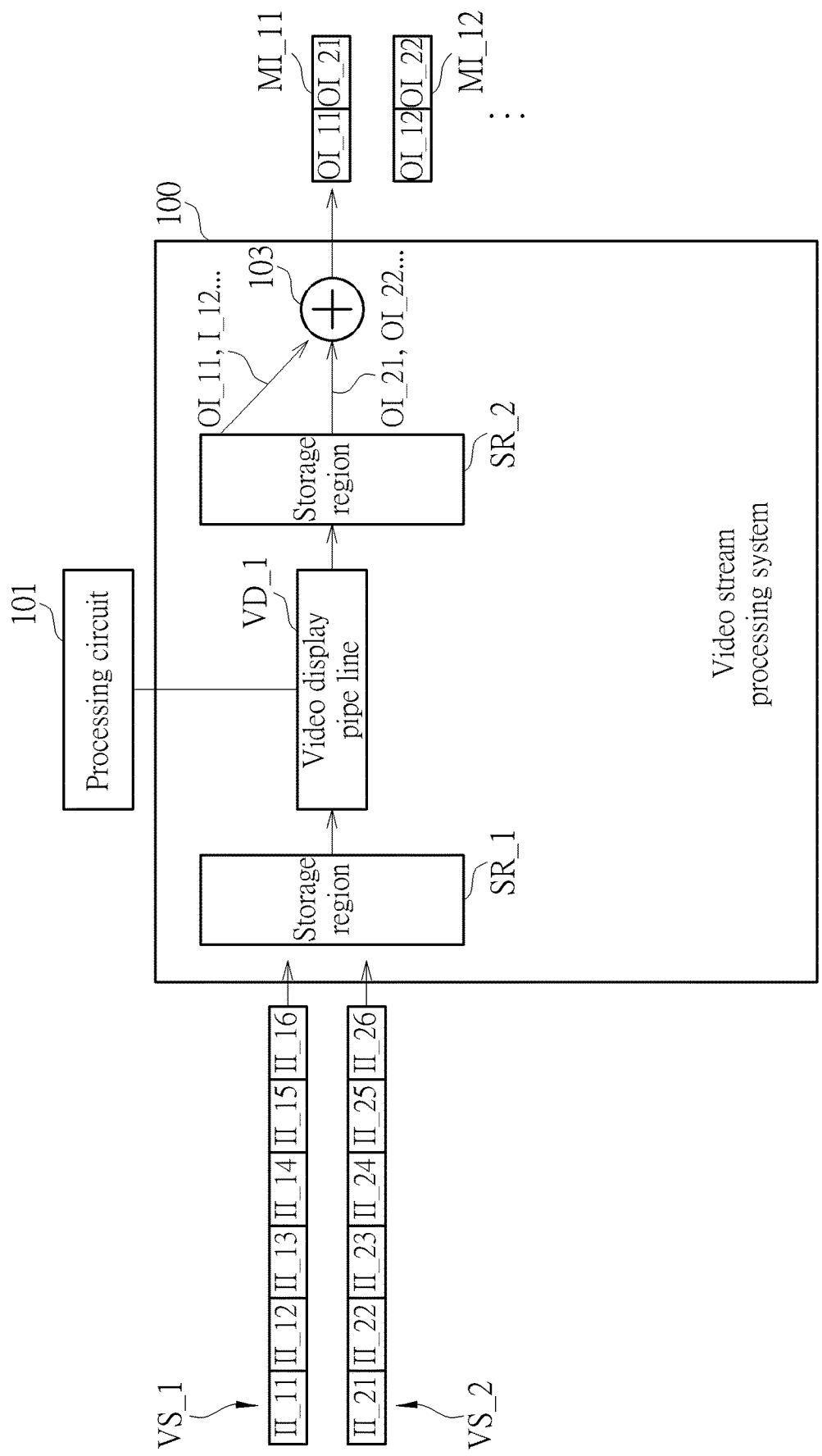
FIG. 1 is a schematic diagram illustrating a video stream processing system according to one embodiment of the present application.

FIG. 1 is a schematic diagram illustrating a video stream processing system according to one embodiment of the present application. As shown in FIG. 1, the video stream processing system 100 comprises a first VDP VD_1 and an image merging circuit 103. The first VDP VD_1 is configured to process first input images (only first input images II_11, II_12, II_13, II_14, II_15 and II_16 are shown for examples) of a first video stream VS_1 to generate first output images (only first output images OI_11, OI_12 are shown for examples), and configured to process second input images (only second input images II_21, II_22, II_23, II_24, II_25 and II_26 are shown for examples) of a second video stream VS_2 to generate second output images (only second output images OI_21, OI_22 are shown for examples). The first VDP VD_1 can perform various processes to the first input images II_11 . . . II_16 and the second input images II_21 . . . II_26. For example, the first VDP VD_1 may perform gradation smoothing, noise reduction, motion compensation, clarity enhancement, contrast enhancement, or color enhancement, but not limited. The first video stream VS_1 and the second video stream VS_2 may come from any video source, for example, a memory or a website.

The image merging circuit 103 is configured to merge one of the first output images and one of the second output images, to generate a first merged image. For example, the image merging circuit 103 merges the first output image OI_11 and the second output image OI_21 to generate a first merged image MI_11. Similarly, the image merging circuit 103 merges the first output image OI_12 and the second output image OI_22 to generate a first merged image MI_12. In other words, the image merging circuit 103 generates a merged video stream corresponding to the first video stream VS_1 and the second video stream VS_2. In one embodiment, the first output images OI_11, OI_12 and the second output images OI_21, OI_22 which are input to the image merging circuit 103 have the same resolutions. In another embodiment, the first output images OI_11, OI_12 and the second output images OI_21, OI_22 which are input to the image merging circuit 103 have different resolutions.

In the embodiment of FIG. 1, the video stream processing system 100 further comprises a first storage region SR_1 and a second storage region SR_2. The first storage region SR_1 is coupled to an input of the first VDP VD_1, configured to buffer the first input images II_11 . . . II_16 and the second input images II_21 . . . II_26. The second storage region SR_2 is coupled to an output of the first VDP VD_1 and an input of the image merging circuit 103, configured to buffer the first output images OI_11, OI_12 and the second output images OI_21, OI_22. In one embodiment, the first storage region SR_1 and the second storage region SR_2 are different regions of a single storage device (e.g., a DRAM). In another embodiment, the first storage region SR_1 and the second storage region SR_2 are different storage devices. Please note, the input image illustrated in each of the embodiments may be a partial region of a video frame or a whole video frame, depending on the processing strategy and hardware performance.

In one embodiment, the first video stream VS_1 and the second video stream VS_2 have identical frame rates. In such case, the first output images OI_11, OI_12 and the second output images OI_21, OI_22 are sequentially generated by the first VDP VD_1 and then merged to generate the first merged images MI_11. MI_12 . . . . In another embodiment, the first video stream VS_1 and the second video stream VS_2 have different frame rates. For example, when the first video stream VS_1 has a higher frame rate of 120 FPS (frames per second) and the second video stream VS_2 has a lower frame rate of 60 fps, the frame of the second video stream VS_2 is updated once every two frames of the first video stream VS_1. Accordingly, the first VDP VD_1 has to process 180 frames in one second. In some embodiments, the first VDP VD_1 does not necessarily follow the chronological order of the video streams to process the input images. In other words, the first VDP VD_1 independently process the input images, and does not necessarily process the second input images once every two first input images based on the frame rates of the video streams. After the input images of the two video streams are processed, output images are obtained, and are output to the image merging circuit 103 to generate merged images based on a frame rate being displayed.

In the embodiment of FIG. 1, the first VDP VD_1 is coupled to a processing circuit 101, which is configured to control the first VDP VD_1. In one embodiment, the processing circuit 101 may further comprises other control functions. For example, if the video stream processing system 100 is provided in a television, the processing circuit 101 can be a processor in the television and can control the operations of the television. For another example, if the video stream processing system 100 is provided in a mobile phone, the processing circuit 101 can be a processor in the mobile phone and can control the operations of the mobile phone. However, the processing circuit 101 can be a circuit specifically designed for the first VDP VD_1.

Figure 2:
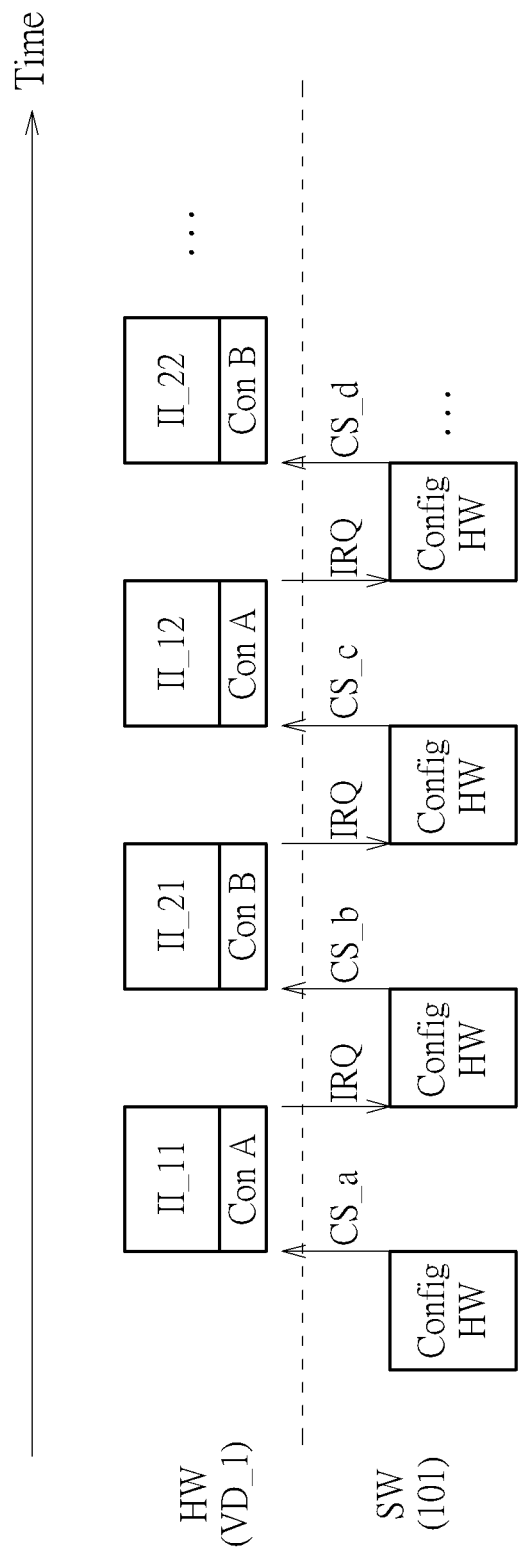
FIG. 2 is a control mechanism of the video stream processing systems illustrated in FIG. 1, according to one embodiment of the present application.

FIG. 2 is a control mechanism of the video stream processing systems illustrated in FIG. 1, according to one embodiment of the present application. In such embodiment, each time the first VDP VD_1 processes an image, the first VDP VD_1 receives configuration settings from the processing circuit 101 before processing the image, and then processes the image based on the configuration settings. Specifically, as shown in FIG. 2, before processing the first image II_11, the processing circuit 101 transmits configuration settings CS_a (e.g., con A) to the first VDP VD_1 and triggers the first VDP VD_1 to process the first image II_11. Then, the first VDP VD_1 processes the first image II_11 according to the configuration settings CS_a.

After the processing of the first image II_11 is completed, the first VDP VD_1 sends an interrupt IRQ to the processing circuit 101 to inform the processing circuit 101 that the processing of the first image II_11 is completed. The processing circuit 101 starts to generate the configuration settings while receiving the interrupt IRQ. Similarly, before processing the second image II_21, the processing circuit 101 transmits configuration settings CS_b to the first VDP VD_1 and triggers the first VDP VD_1 to process the second image II_21. Then, the first VDP VD_1 processes the second image II_21 according to the configuration settings (e.g., con B). The first VDP VD_1 may process other first images and second images following the same way, as shown in FIG. 2.

The configuration settings in FIG. 2 may vary corresponding to the components contained in the first VDP VD_1. In one embodiment, the configuration settings comprises at least one kind of following parameters: a storage region address to be read by the first VDP (e.g., an address of the first storage region SR_1), a storage region address to be written by the first VDP (e.g., an address of the second storage region SR_2), and image quality improvement parameters (if the first VDP VD_1 comprises a function of image quality improvement).

Figure 3:
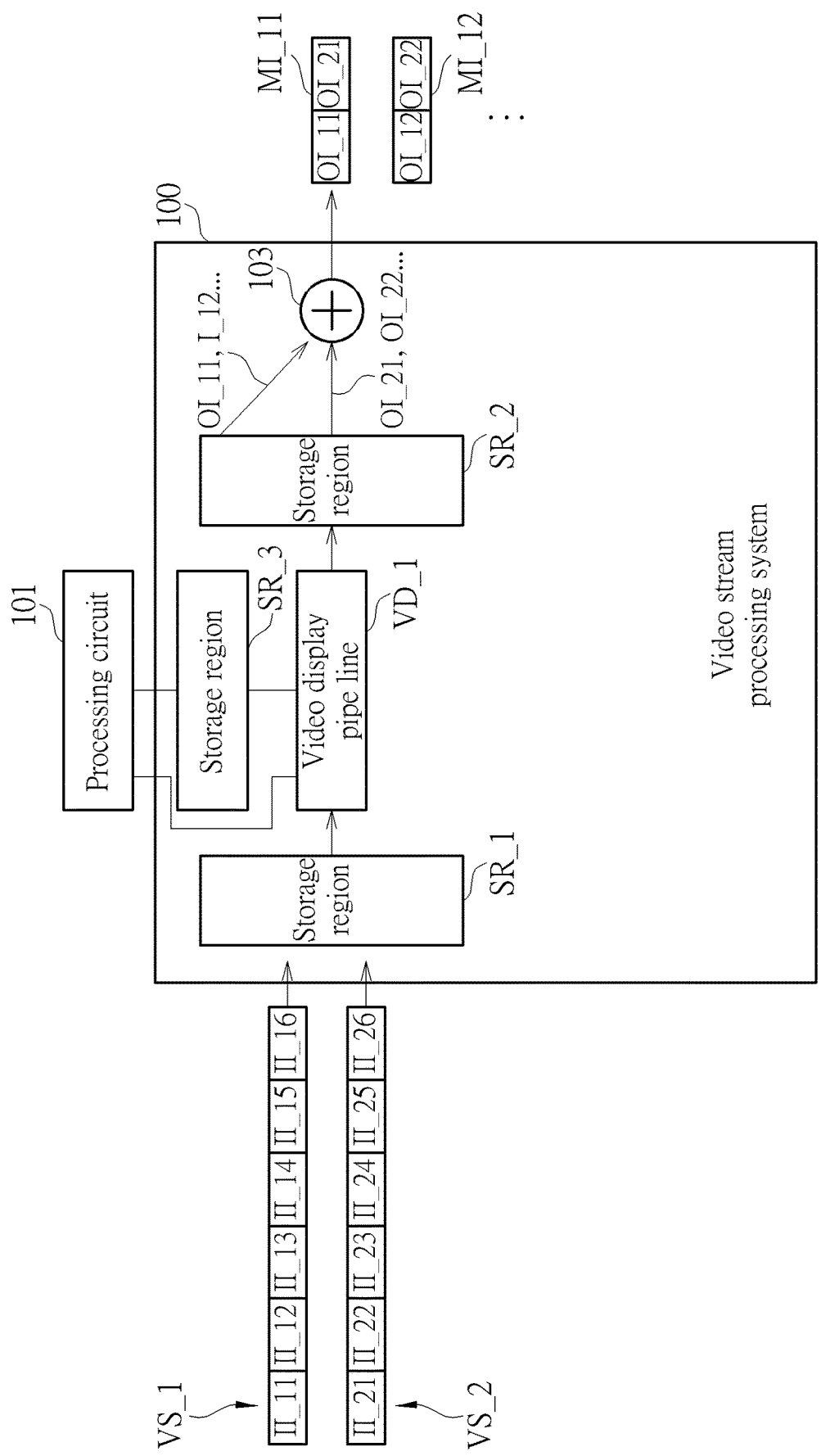
FIG. 3 is a schematic diagram illustrating a video stream processing system according to another embodiment of the present application.
Figure 4:
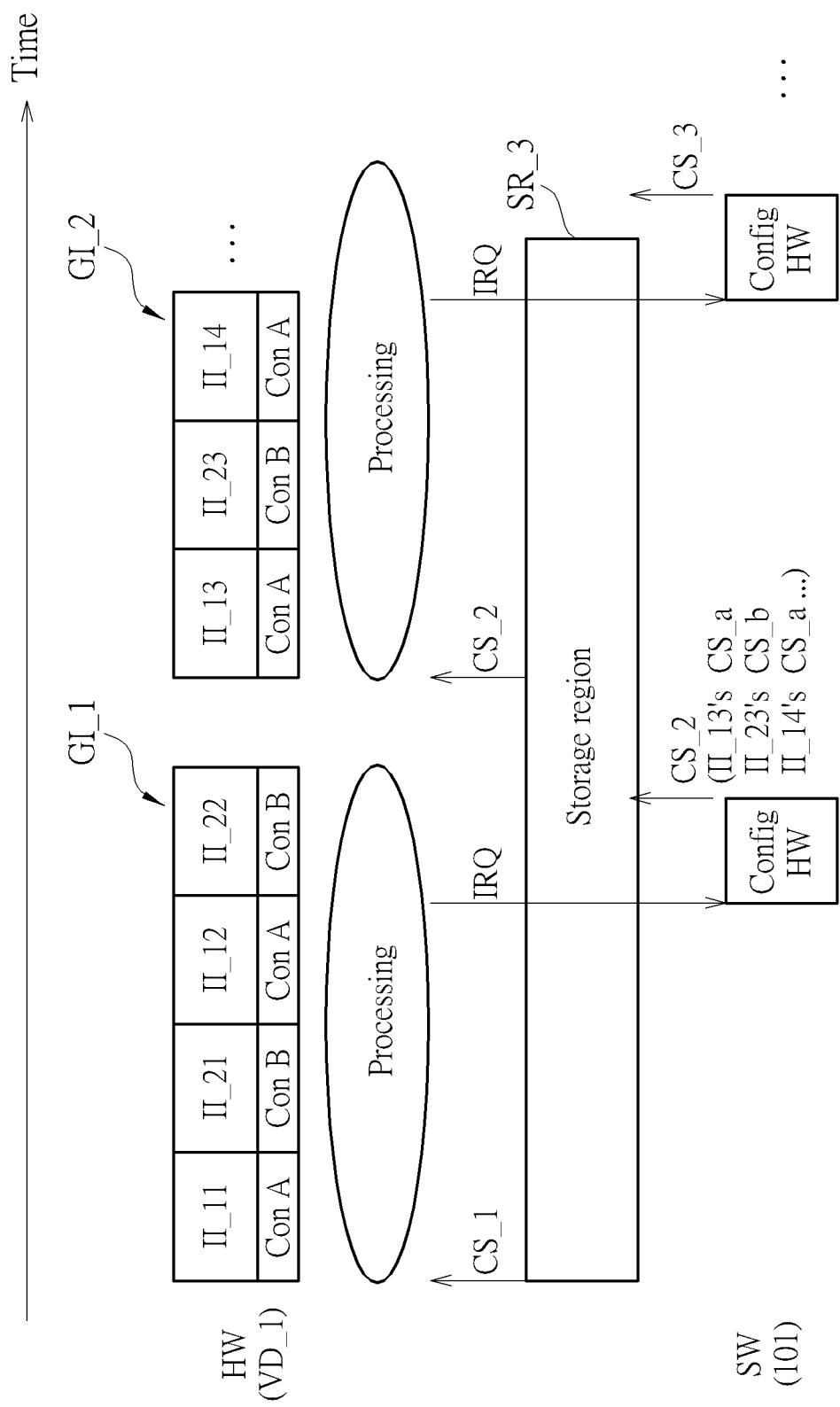
FIG. 4 is a control mechanism of the video stream processing systems illustrated in FIG. 3, according to one embodiment of the present application.

In the embodiment of FIG. 2, the first VDP VD_1 receives configuration settings for one image each time. However, in another embodiment, the first VDP VD_1 receives configuration settings for a group of images one time rather than for only one image. FIG. 3 is a schematic diagram illustrating a video stream processing system according to another embodiment of the present application. FIG. 4 is a control mechanism of the video stream processing systems illustrated in FIG. 3, according to one embodiment of the present application. In the embodiment of FIG. 3, the processing circuit 101 is coupled to a third storage region SR_3. In one embodiment, the first storage region SR_1, the second storage region SR_2 and the third storage region SR_3 are different regions of a single storage device (e.g., a DRAM). In another embodiment, the first storage region SR_1, the second storage region SR_2 and the third storage region SR_3 are different storage devices.

The third storage region SR_3 is configured to buffer a first group of configuration settings for a first group of images from the processing circuit 101. The first VDP VD_1 reads the first group of configuration settings from the third storage region SR_3 before processing the first group of images, and processes the first group of images according to the first group of configuration settings. For example, in the embodiment of FIG. 4, the first VDP VD_1 reads the first group of configuration settings CS_1 (e.g., Con A, Con B) from the third storage region SR_3 before processing the first group of images GI_1 (e.g., the first images II_11, II_12 and the second images II_21, II_22). Next, the first VDP VD_1 processes images in the first group of images GI_1 sequentially according to the first group of configuration settings CS_1. In one embodiment, the processing circuit 101 sets the storage address of the first group of configuration settings CS_1 to the first VDP VD_1. Then, the first VDP VD_1 sequentially reads required configuration settings from the third storage region SR_3 (e.g., II_11's CS_a, II_21's CS_b, II_12's CS_a, II_22's CS_b).

Afterwards, the first VDP VD_1 sends an interrupt IRQ to trigger the processing circuit 101 to generate a second group of configuration settings CS_2 while processing the first group of images GI_1, and then the processing circuit 101 correspondingly transmits the second group of configuration settings CS_2 to the third storage region SR_3. In one embodiment, the first VDP VD_1 sends the interrupt IRQ in response to an execution status of the first group of images GI_1. In another embodiment, the first VDP VD_1 sends the interrupt IRQ while completing the processing of the first group of images GI_1. Next, the first VDP reads the second group of configuration settings CS_2 from the third storage region SR_3 before processing a second group of images GI_2, and processes images in the second group of images GI_2 sequentially, according to the second group of configuration settings CS_2.

It will be appreciated that the first group of images GI_1 and the second group of images GI_2 are not limited to have identical image arrangements. For more detail, the first group of images GI_1 comprises a plurality of pairs of images. Each of the pairs of images comprises a first image and a second image. For example, the first group of images GI_1 comprises two pairs of images. One pair of images comprises the first image II_11 and the second image II_21, and the other pair of images comprises the first image II_12 and the second image II_22. However, the second group of images GI_2 is not limited to comprise such pair of images. In some embodiments, the images from the video streams are not uniformly distributed in the groups of images. For example, the first group of images GI_1 may comprise three first input images II_11, II_12 and II_13 and one second input image II_21 and the second group of images GI_2 may comprise one first input image II_14 and three second input images II_22, II_23 and II_24 and the third group of images GI_3 may comprise two first input images II_15 and II_16. Additionally, the group of configuration settings CS_1, CS_2 in FIG. 4 may vary corresponding to the components contained in the first VDP VD_1. In one embodiment, the group of configuration settings comprises at least one kind of following parameters: a storage region address to be read by the first VDP (e.g., an address of the first storage region SR_1), a storage region address to be written by the first VDP (e.g., an address of the second storage region SR_2), and image quality improvement parameters (if the first VDP VD_1 comprises a function of image quality improvement).

Figure 5:
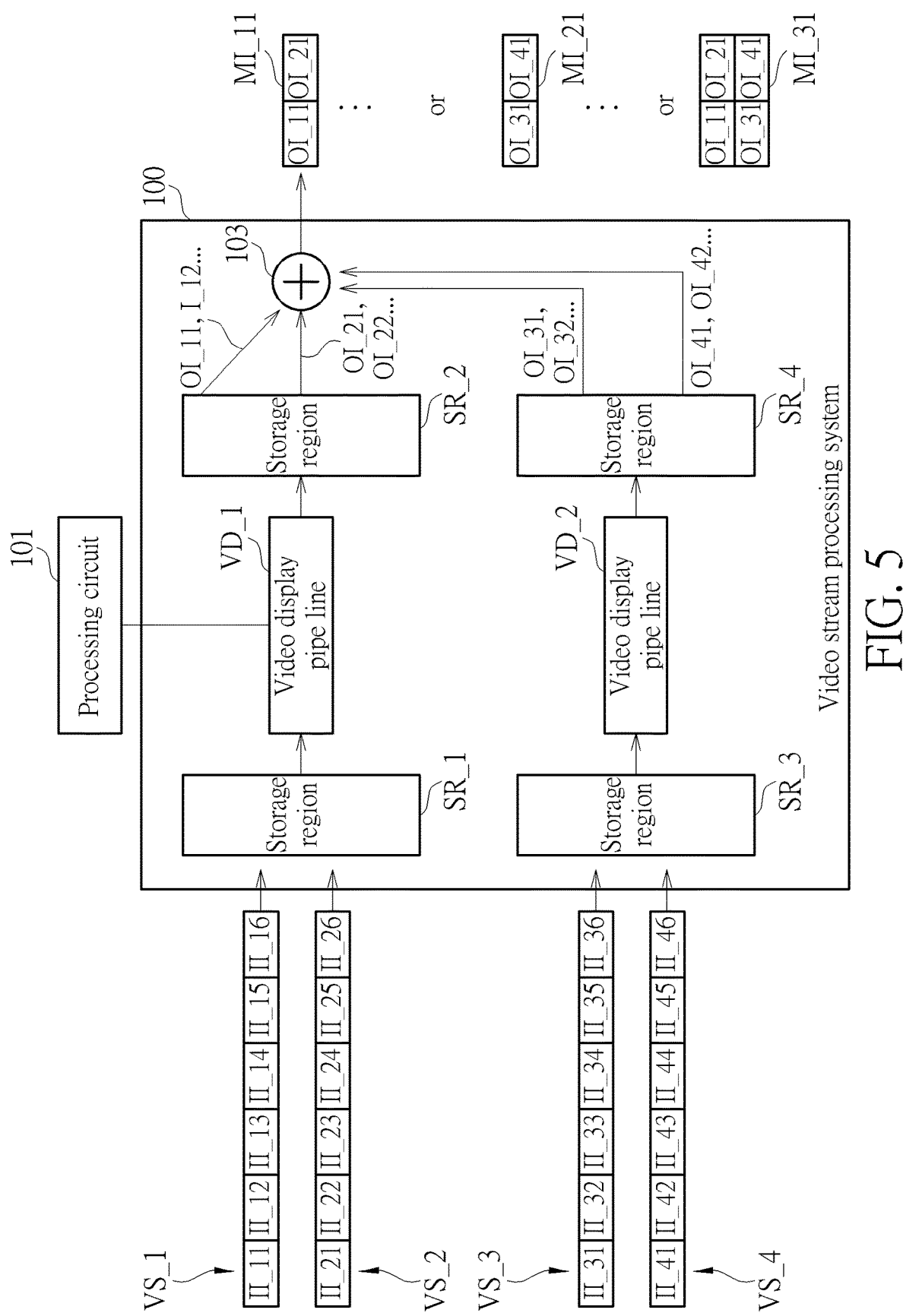
FIG. 5 and FIG. 6 are schematic diagrams illustrating video stream processing systems according to different embodiments of the present application.

In the above-mentioned embodiments, the video stream processing system 100 comprises only one VDP, which can process more than one video streams. However, the video stream processing system 100 may comprise more than one VDP, which can respectively process more than one video streams. FIG. 5 is a schematic diagram illustrating a video stream processing system according to another embodiment of the present application. As shown in FIG. 5, the video stream processing system 100 further comprises a second VDP VD_2. The second VDP VD_2 is configured to process third input images II_31 . . . II_36 in a third video stream VS_3 to generate third output images OI_31, OI_32, and configured to process fourth input images II_41 . . . II_46 in a fourth video stream VS_4 to generate fourth output images OI_41, OI_42. After that, the image merging circuit 103 is configured to merge one of the third output images II_31 . . . II_36 and one of the fourth output images II_41 . . . II_46, to generate a second merged image. For example, the image merging circuit 103 merges the third output image II_31 and the fourth output image II_41 to generate the second merged image MI 21.

One of the first VDP VD_1 and the second VDP VD_2 may be selected to generate the merged image. If the first VDP VD_1 is selected, first merged images corresponding first input images thereof are generated. That is, a first multi-video stream corresponding to the first video steam VS_1 and the second video steam VS_2 is generated. If the second VDP VD_2 is selected, second merged images corresponding second input images thereof are generated. That is, a second multi-video stream corresponding to the third video steam VS_3 and the fourth video steam VS_4 is generated. The number of the VDP can be reduced in view of above-mentioned embodiments. Accordingly, the first VDP VD_1 and the second VDP VD_2 can both have high qualities. By this way, the user experience can still be good even if the video stream processing system 100 switches between the first VDP VD_1 and the second VDP VD_2.

The multi-video stream generated by the image merging circuit 103 can correspond to more than one VDPs rather than only one VDP. Accordingly, as shown in FIG. 5, a third merged image MI 31 which comprises the first output image OI_11, the second output image OI_21, the third output image OI_31 and the fourth output image OI_41 can be generated if both of the first VDP VD_1 and the second VDP VD_2 are selected.

Figure 6:
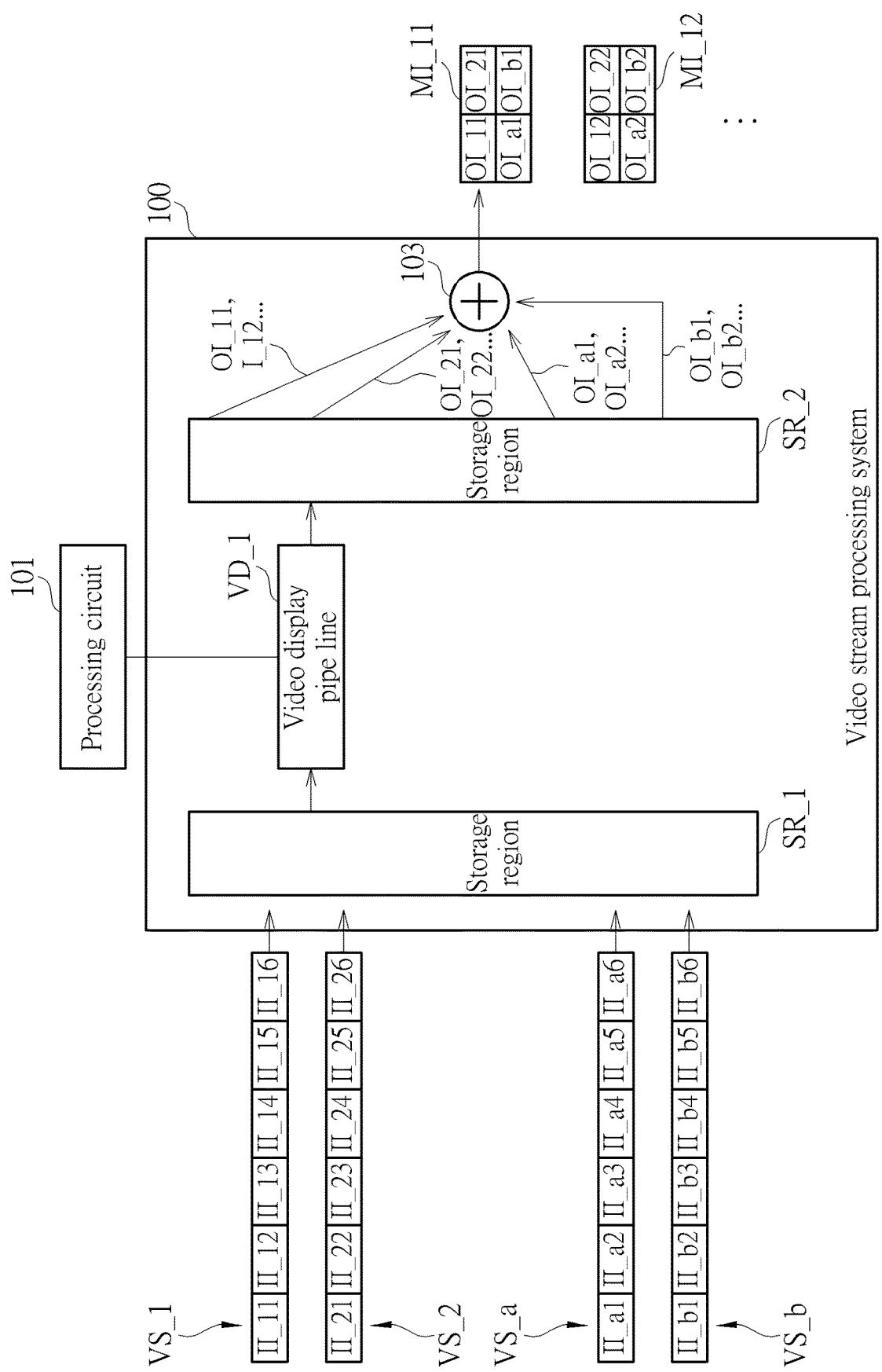

In above-mentioned embodiments, two video streams are processed by a single VDP. However, a single VDP can process more than two video streams. As shown in the embodiment of FIG. 6, the first storage region SR_1 further receives the video streams VS_a, VS_b. In such case, the first storage region SR_1 buffers the first input images II_11 . . . II_16 of the first video stream VS_1, the second input images II_21 . . . II_26 of the second video stream VS_2, the input images II_a1 . . . II_a6 of the video stream VS_a and input images II_b1 . . . II_b6 of the video stream VS_b. The first VDP VD_1 processes the first input images II_11 . . . II_16 to generate first output images OI_11, OI_12 . . . , processes the second input images II_21 . . . II_26 to generate second output images OI_21, OI_22 . . . , processes the input images II_a1 . . . II_a6 to generate output images OI_a1, OI_a2 . . . , and processes the input images II_b1 . . . II_b6 to generate output images OI_b1, OI_b2 . . . . Also, the second storage region SR_2 buffers the first output images OI_11, OI_12, the second output images OI_21, OI_22, the output images OI_a1, OI_a2 . . . and the output images OI_b1, OI_b2 . . . .

The image merging circuit 103 merges one of the first output images OI_11, OI_12 . . . , one of the second output images OI_21, OI_22, one of the output images OI_a1, OI_a2 . . . and one of the output images OI_b1, OI_b2 to generate a first merged image. For example, the image merging circuit 103 merges the first output image OI_11, the second output image OI_21, the output image OI_a1 and the output image OI_b1 to generate a first merged image MI_11. For another example, the image merging circuit 103 merges the first output image OI_12, the second output image OI_22, the output image OI_a2 and the output image OI_b2 to generate a first merged image MI_12. In other words, a merged multi-video stream corresponding to the first video stream VS_1, the second video stream VS_2, the video stream VS_a and the video stream VS_b is generated.

In one embodiment, the first output images OI_11, OI_12, the second output images OI_21, OI_22, the output images OI_a1, OI_a2, OI_b1, OI_b2 which are input to the image merging circuit 103 have the same resolutions. In another embodiment, the first output images OI_11, OI_12, the second output images OI_21, OI_22, the output images OI_a1, OI_a2, OI_b1, OI_b2 which are input to the image merging circuit 103 have different resolutions.

Figure 7:
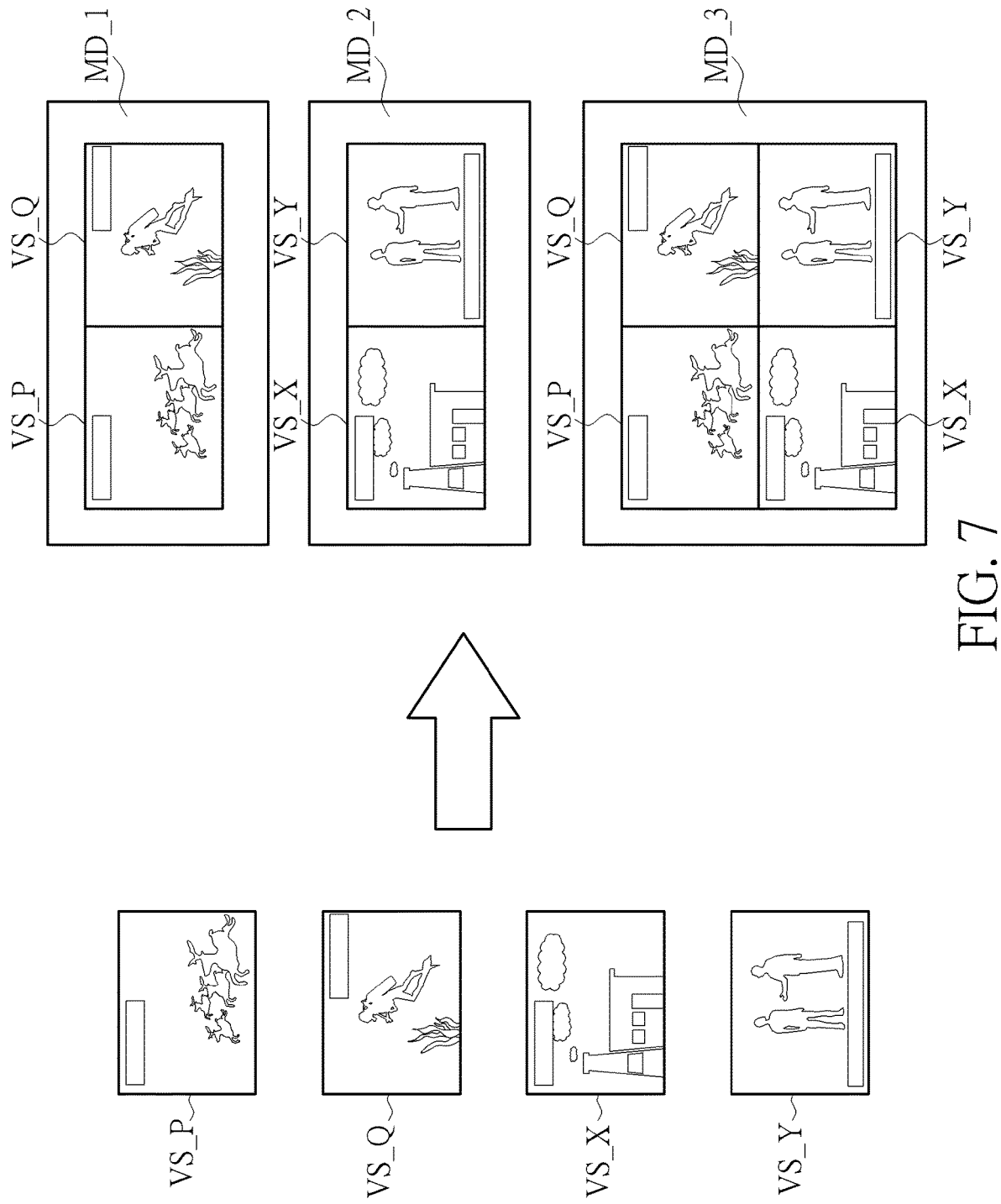
FIG. 7 is a scenario diagram illustrating examples of multi-video displays which use the video stream processing systems in above-mentioned embodiments.

FIG. 7 is a scenario diagram illustrating a multi-video display which uses the video stream processing system in above-mentioned embodiments. In the embodiment of FIG. 7, the video streams VS_P, VS_Q, VS_X, VS_Y are television programs and the multi-video displays MD_1, MD_2, MD_3 are televisions. In one embodiment, the multi-video display MD_1 corresponds the embodiment of FIG. 1. That is, the multi-video display MD_1 displays a merged video stream corresponding to the video streams VS_P, VS_Q.

In one embodiment, the multi-video displays MD_1, MD_2, MD_3 correspond to the embodiment of FIG. 5. That is, the first VDP VD_1 or the second VDP VD_2 can be selected, such that a merged video stream corresponding to the video streams VS_P, VS_Q can be displayed as shown on the multi-video displays MD_1 or a merged video stream corresponding to the video streams VS_X, VS_Y can be displayed as shown on the multi-video displays MD_2 or a merged video stream corresponding to the video streams VS_P, VS_Q, VS_X, VS_Y can be displayed as shown on the multi-video displays MD_3. Please note in such embodiment, the multi-video display MD_1, MD_2 and MD_3 scenarios are the same multi-video display. In one embodiment, the multi-video display MD_3 corresponds the embodiment of FIG. 6. That is, the multi-video display MD_3 displays a merged video stream corresponding to the video streams VS_P, VS_Q, VS_X and VS_Y. However, the number of video streams to be merged can be adjusted upon the need and the merged video stream can be displayed in other forms (e.g., each video can output different resolution or can overlap each other) rather than the rectangles or squares shown in FIG. 7.

Figure 8:
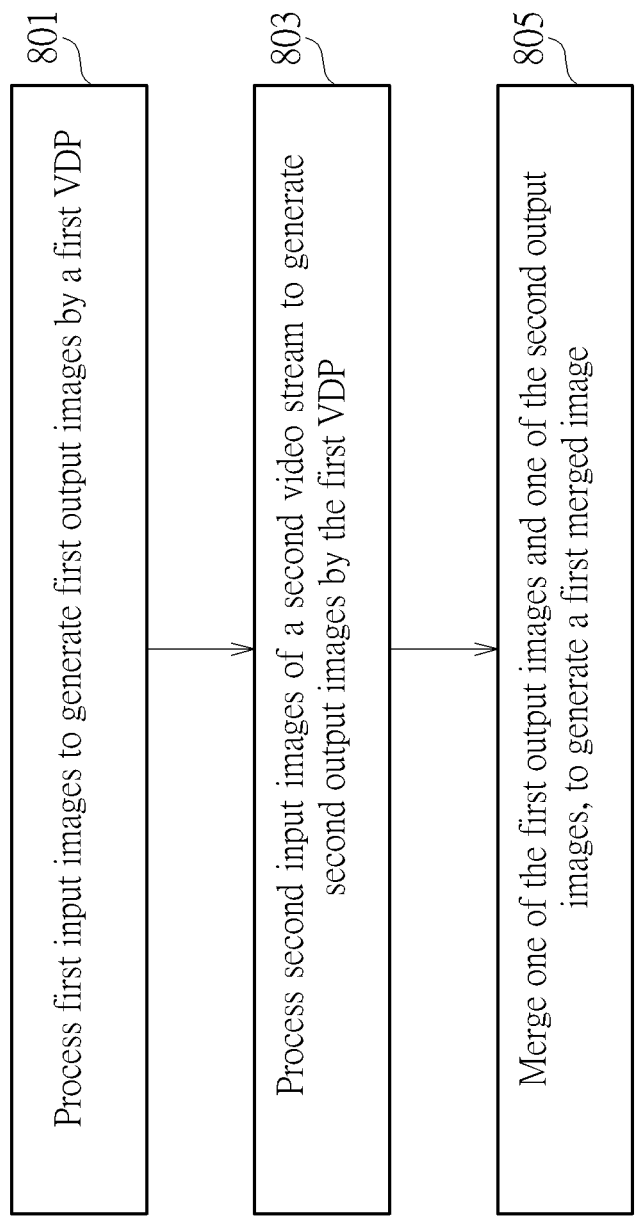
FIG. 8 is a flow chart illustrating a video stream processing method according to one embodiment of the present application.

In view of above-mentioned embodiments, a video stream processing method can be acquired. FIG. 8 is a flow chart illustrating a video stream processing method according to one embodiment of the present application. The video stream processing method comprises:

Step 801
Process first input images (e.g., II_11 . . . II_16) of a first video stream (e.g., VS_1) to generate first output images (e.g., OI_11, OI_12) by a first VDP (e.g., VD_1).

Step 803
Process second input images (e.g., II_21 . . . II_26) of a second video stream (e.g., VS_2) to generate second output images (e.g., OI_21, OI_22) by the first VDP Step 805
Merge one of the first output images and one of the second output images, to generate a first merged image (e.g., MI_11 or MI_12).

Other detail steps can be acquired in view of above-mentioned embodiments, thus are omitted for brevity here.

In view of above-mentioned embodiments, the number of VDPs can be decreased since a single VDP can process more than one video streams. Also, the transition between VDPs with different image qualities can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video stream processing system, comprising:
a first VDP (video display pipe line), configured to process first input images of a first video stream to generate first output images, and configured to process second input images of a second video stream to generate second output images; and
an image merging circuit, configured to merge one of the first output images and one of the second output images, to generate a first merged image;
wherein the video stream processing system further comprises:
a third storage region, configured to buffer a first group of configuration settings corresponding to a first group of images from a processing circuit;
wherein the first VDP reads the first group of configuration settings from the third storage region before processing the first group of images, and processes the first group of images according to the first group of configuration settings.

2. The video stream processing system of claim 1, further comprising:
a first storage region, coupled to an input of the first VDP, configured to buffer the first input images and the second input images; and
a second storage region, coupled to an output of the first VDP and an input of the image merging circuit, configured to buffer the first output images and the second output images.

3. The video stream processing system of claim 1, wherein the first VDP sends an interrupt to trigger the processing circuit to generate a second group of configuration settings corresponding to a second group of images while processing the first group of images, and the processing circuit transmits the second group of configuration settings to the third storage region;
wherein the first VDP reads the second group of configuration settings from the third storage region before processing the second group of images, and processes the second group of images according to the second group of configuration settings.

4. The video stream processing system of claim 3, wherein the interrupt is sent in response to an execution status of the first VDP.

5. The video stream processing system of claim 1, wherein the first group of configuration settings comprises at least one kind of following parameters: a storage region address to be read by the first VDP, a storage region address to be written by the first VDP, and image quality improvement parameters.

6. The video stream processing system of claim 1, further comprising:
a second VDP, configured to process third input images in a third video stream to generate third output images, and configured to process fourth input images in a fourth video stream to generate fourth output images;
wherein the image merging circuit is configured to merge one of the third output images and one of the fourth output images, to generate a second merged image.

7. A video stream processing method, comprising:
processing first input images of a first video stream to generate first output images by a first VDP (video display pipe line);
processing second input images of a second video stream to generate second output images by the first VDP; and
merging one of the first output images and one of the second output images, to generate a first merged image;
wherein the video stream processing method further comprises:

buffering a first group of configuration settings corresponding to a first group of images from a processing circuit in a third storage region;

reading the first group of configuration settings from the third storage region before processing the first group of images by the first VDP, and processes the first group of images according to the first group of configuration settings by the first VDP.

8. The video stream processing method of claim 7, further comprising:

buffering the first input images and the second input images by a first storage region; and buffering the first output images and the second output images by a second storage region.

9. The video stream processing method of claim 7, further comprising:

sending an interrupt by the first VDP to trigger the processing circuit to generate a second group of configuration settings corresponding to a second group of images while the first VDP processing the first group of images, and transmitting the second group of configuration settings to the third storage region by the processing circuit;

reading the second group of configuration settings from the third storage region before processing the second group of images by the first VDP, and processing the second group of images according to the second group of configuration settings by the first VDP.

10. The video stream processing method of claim 9, further comprising:

sending the interrupt in response to an execution status of the first VDP.

11. The video stream processing method of claim 7, wherein the first group of configuration settings comprises at least one kind of following parameters: a storage region address to be read by the first VDP, a storage region address to be written by the first VDP, and image quality improvement parameters.

12. The video stream processing method of claim 7, further comprising:

processing third input images in a third video stream to generate third output images by a second VDP, and processing fourth input images in a fourth video stream to generate fourth output images by the second VDP;

merging one of the third output images and one of the fourth output images, to generate a second merged image.

13. A video stream processing system, comprising:

a first VDP, configured to process input images of different video streams to generate output images; and an image merging circuit, configured to merge at least two of the output images to generate a merged video stream corresponding to the video streams;

wherein the video stream processing system further comprises:

a third storage region, configured to buffer a first group of configuration settings from a processing circuit;

wherein the first VDP reads the first group of configuration settings from the third storage region before processing the first group of images, and processes the first group of images according to the first group of configuration settings.

14. A video stream processing system, comprising:

a first VDP (video display pipe line), configured to process first input images of a first video stream to generate first output images, and configured to process second input images of a second video stream to generate second output images; and an image merging circuit, configured to merge one of the first output images and one of the second output images, to generate a first merged image;

wherein each time the first VDP processes an image, the first VDP receives configuration settings from a processing circuit before processing the image and processes the image based on the configuration settings.

15. The video stream processing system of claim 14, wherein the configuration settings comprises at least one kind of following parameters: a storage region address to be read by the first VDP, a storage region address to be written by the first VDP, and image quality improvement parameters.

16. A video stream processing method, comprising:

processing first input images of a first video stream to generate first output images by a first VDP (video display pipe line);

processing second input images of a second video stream to generate second output images by the first VDP; and merging one of the first output images and one of the second output images, to generate a first merged image;

wherein the video stream processing method further comprises:

receiving configuration settings from a processing circuit by the first VDP before processing an image, and processing the image based on the configuration settings by the first VDP, for each time the first VDP processes the image.

17. The video stream processing method of claim 16, wherein the configuration settings comprises at least one kind of following parameters: a storage region address to be read by the first VDP, a storage region address to be written by the first VDP, and image quality improvement parameters.

* * * * *